June 28, 1960  J. W. ANDERSON  2,942,748
METHOD OF FASTENING TWO PART PLASTIC FASTENER BY
FUSION FROM FRICTIONAL HEAT OF ROTATION
Filed Oct. 18, 1954

Rotated under axial pressure to bond by heat of friction

Bonded by heat of friction

Held stationary

Fused bond

INVENTOR
John W. Anderson
BY
ATTORNEY

United States Patent Office 2,942,748
Patented June 28, 1960

1

2,942,748

METHOD OF FASTENING TWO PART PLASTIC FASTENER BY FUSION FROM FRICTIONAL HEAT OF ROTATION

John Wiley Anderson, Newtown, Conn.
(% Plastic Molding Corp., Sandy Hook, Conn.)

Filed Oct. 18, 1954, Ser. No. 462,966

5 Claims. (Cl. 218—29)

This invention relates to a two-part, post type of fastener in which each part comprises a headed body of thermoplastic resin. The invention further relates to a method of bonding such headed fastener parts together by coalescence of the thermoplastic at mutually contacting surfaces of the fastener parts.

An object of the invention is to produce such coalescence by the application of relative rotary movement to portions of the fastener parts that taper, while such parts are in surface contact under axial pressure, thereby to avoid the use of screw threads, heading over operations, eyelet setting operations and the like for securing the fastener parts together.

A related object is to reenforce the binding strength of such a fastener by causing mechanical deformation of telescopically interengaged portions into interlocking engagement, and to prevent at least one of the fastener parts from turning relative to the work material to be bound thereby through tightening expansion of the girth of the fastener.

These and other objects of the invention will be apparent from the following description of a successful embodiment of and way of practicing the invention, such description having reference to the appended drawings wherein.

The drawings illustrate optional forms of heads and engaged shanks on each of cooperative members that are to be united by practicing the method of this invention to form a fastener embodying the invention. Each of the members comprises a body of synthetic molded thermoplastic resin having physical properties suitable for the purposes of the invention such as nylon. Properties that are desirable in the thermoplastic material of the two members include an ability to react to an application of heat so that their surfaces will fuse together into mutually bonded relationship. Specifically it has been discovered that sufficient heat can be produced by the friction generated by merely rubbing together conical contacting surfaces of two such fastener members.

Figure 2:
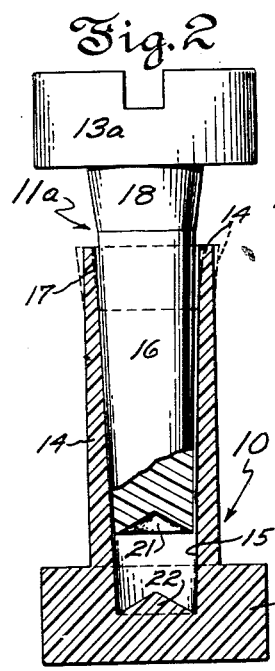
Fig. 2 shows partly in section on the plane 2—2 in Fig. 3 a modified form of fastener whose overlapping shank portions are in process of being assembled.
Figure 1:
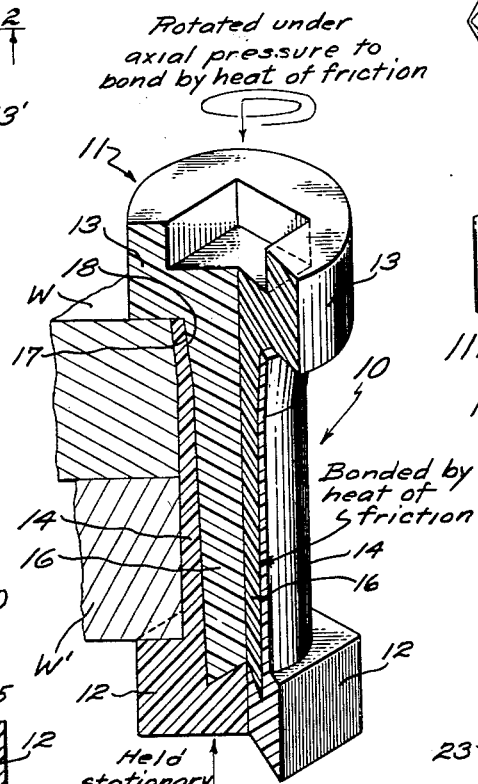
Fig. 1 is a perspective view of a united two-part fastener, partially broken away, constructed and applied to work in accordance with the present invention.

Referring to Figs. 1 and 2, one of the thermoplastic bodies comprises a sleeve member 10 molded to a shape that somewhat resembles a hollow rivet, comprising a head 12 or 12' and a shank 14. The latter has a cylin-

2 drical external surface and is made hollow by an elongate socket 15 central thereof which opens through the end of shank 14 remote from head 12. Socket 15 tapers in relation to the axis at an angle of approximately one or two degrees, its larger end being at the mouth 17 where the taper is relation to the axis may increase to, say, seven degrees approximately. Here the socket 15 is countersunk steeply at a somewhat more flaring angle of taper. This so weakens the tubular shank wall 14 at the mouth of the socket that it can be flared outward from its full line shape to its broken line shape in Fig. 2. This strengthens the holding engagement of the sleeve member 10 with a work piece W through which the sleeve member 10 extends. Sleeve member 10 may also extend through an associated work piece W' that is to be secured to work piece W in face to face contact therewith by the fastener. A multiplicity of such work pieces can be sandwiched between outer plies, as laminae, thereby to be held together by my improved fastener. The material of the work pieces may be hard or soft and their surfaces rough or smooth.

Figure 3:
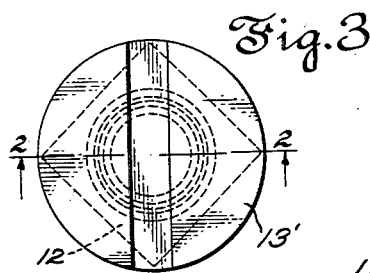
Fig. 3 is a plan view of the fastener of Fig. 2.
Figure 6:
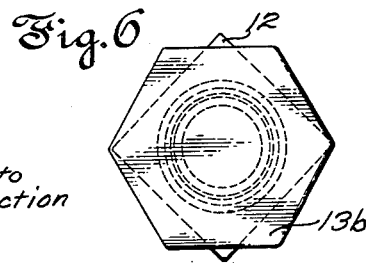
Fig. 6 is a plan view of the fastener of Fig. 5.
Figure 5:
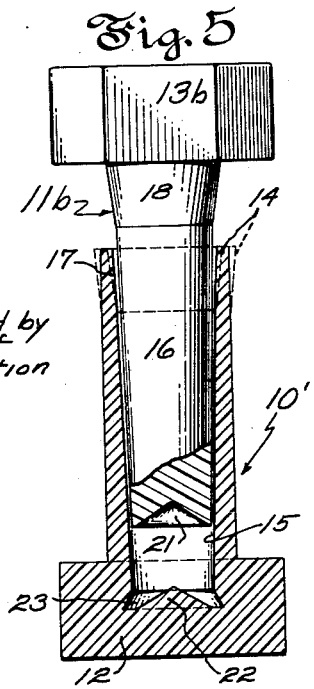
Fig. 5 shows a further modified construction of the two-part fastener in process of being assembled.
Figure 4:
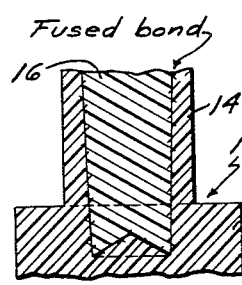
Fig. 4 shows portions of the fastener shanks of Fig. 2 in fully assembled relation.
Figure 8:
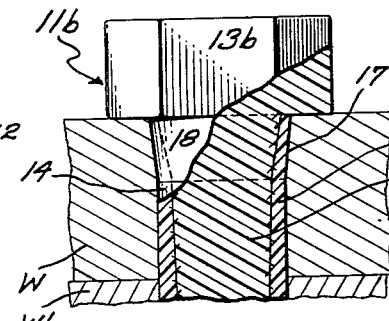
Figs. 7 and 8 show different portions of the fastener shanks of Fig. 5 in fully assembled relation.

The head 12 may be slotted as in Figs. 3 and 4 to receive a screw driver, or may be recessed as in Fig. 1 to receive a plug wrench, or may be flat sided as in Figs. 5, 6 and 8 to be engaged by a conventional jaw wrench or socket wrench or by a machine chuck. While in the drawings these various styles of head are illustrated in connection with plug member 11 which is next to be described, a head of any of these styles can as readily be provided on the sleeve member 10 of the fastener.

The other or plug member 11, 11a or 11b of the fastener comprises a head 13 and a shank 16 which tapers at the same angle as does socket 15 for most of its length. In a short portion of its length adjacent the head 13, shank 16 has a steeper taper at 18 that accords with the taper of the socket mouth at 17 in sleeve member 10. The opposite smaller end of shank 16 contains a conical recess 21 that accords in shape iwth a conical boss 22 formed at the bottom of socket 15.

In practicing the invention layers of work such as W and W' that are to be fastened together are provided with aligned holes of equal size receptive to and fitting the hollow shank 14 of sleeve member 10. The combined thickness of the work should be at least as great as the length of shank 14 but not greater unless the work material is sufficiently soft or yielding to be compressible. In use of the fastener as a hinge or pivot pin the combined thickness of multiple work pieces swingably coupled together thereby should be sufficiently less than the length of shank 14 to provide clearance for permitting freedom of swinging movement of the work pieces relative to one another and to the fastener.

The head 12 of sleeve member 10 will be supported firmly against thrust in an axial direction and held from rotating by any suitable means such as wrench, chuck or vice while the shank 16 of plug member 11 is inserted in socket 15. If its shank is about 3/16" in diameter the plug member will be rotated in socket 15 at a speed of about two thousand to three thousand r.p.m., more or less, by rotary power drive of its head 13. While thus being rotated plug member 11 is subjected to a thrust of ten to fifteen pounds in an axial direction against the tubular walls of the socket 15 while shank 16 is telescopically nested in the latter. Such thrust is applied by any suitable power tool such as in a drill press as a drill by hand feeding is forced endwise against the work that is to be drilled. This sets up friction between the similarly tapering, mutually contacting surfaces of shank 16 and sleeve member 14 such that sufficient heat is generated to fuse said mutually contacting surfaces of the thermoplastic material of the fastener parts into a bonded union within five to ten seconds. The bond becomes permanent and strong after rotation has ceased and the fused together surfaces of the fastener members have cooled while remaining pressed together after coalescing.

The tendency of the more steeply tapered shank portion 18 of plug member 10 to expand the yieldable hollow sleeve shank diametrically at socket mouth 17 causes the tubular walls 14 at this end of sleeve member 10 to press radially outward against the material of work piece W whereby to wedge member 10 in the work. This helps in opposing relative rotary displacement of the sleeve member relative to the work.

Figure 7:
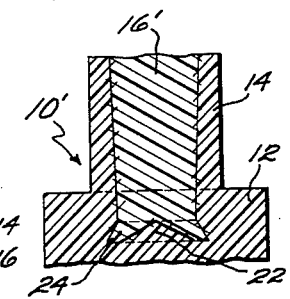

In Figs. 5 and 7 an additional clinging together strength of the fastener members results from forcing the annular edges 24 of shank 16, which are wedge-shaped in radial profile, into outward flaring engagement with an outwardly flared annular groove 23 of dovetail-shape that is laterally undercut in the head 12 about the base of the slope of the conical boss 22 at the bottom or blind end of socket 15 as shown in Fig. 7. This interlocking engagement of shank end 24 with the undercut annular groove 23 takes place just before the cavitated end 21 of shank 16 bottoms on the conical boss 22 and can result from the aforesaid axial thrust on the parts when their surfaces are sufficiently warmed and softened by the heat of friction whether or not accompanied by relative spinning of the parts.

The appended claims are directed to and intended to cover all variations of the exact shapes, sizes and material of fastener parts herein mentioned as well as all variations of the exact pressures and speeds of rotation suggested for successful practice of the invention as come within the broadest fair interpretation of the wording of the claims.

I claim:

1. The method of permanently uniting in telescoped relation to form a fastener the shank portions respectively of a headed plug member and of a headed sleeve member both comprising a body of fusible thermoplastic resin, which includes the steps of, contouring at least part of the shank portion of one of said members in tapering conformity to the contour of at least part of the shank portion of the other of said members, telescoping said shank portions, and pressing the shank portion of one of said members axially against the shank portion of the other of said members while simultaneously causing rotary movement of said shank portion of one of said members relatively to and in rubbing contact with the shank portion of the other of said members, the force of said pressure and the speed of said rotary movement being sufficient to heat said thermoplastic material at the contacting surfaces of said shank portions to a point of fusion, whereby said contacting surfaces of said members are caused to coalesce.

2. The method of fastening together plural plies of work sheets comprising the steps of, projecting through sheets of work material a headed hollow sleeve member of thermoplastic resin having an internal curved surface of tapering contour, inserting a correspondingly tapered curved surface of the shank portion of a headed plug member of thermoplastic resin inside of said sleeve member in at least partially telescoped relation thereto, pressing said tapering surfaces of said members together in the direction of their taper, and simultaneously causing rotary movement of one of said members relatively to and in rubbing contact with the other of said members under a pressure force and a speed of rotary rubbering movement sufficient to heat said thermoplastic material at said tapering contacting surfaces of said members to a point of fusion, whereby said tapering surfaces of said members are caused to coalesce.

3. The method defined in claim 2, in which the said speed of rotation is between two thousand and three thousand revolutions per minute.

4. The method defined in claim 2, in which the said force with which the said tapering members are pressed together is approximately between ten and fifteen pounds.

5. The method defined in claim 2, in which the said speed of rotation is between two thousand and three thousand revolutions per minute and the said tapering members are pressed together with a force of approximately between ten and fifteen pounds during their relative rotation.

References Cited in the file of this patent

UNITED STATES PATENTS

| | | |
|---|---|---|
| 238,010 | Thomas | Feb. 22, 1881 |
| 646,738 | Ingalls | Apr. 3, 1900 |
| 1,186,829 | Pohlman et al. | June 13, 1916 |
| 2,065,333 | Kirley | Dec. 22, 1936 |
| 2,211,102 | Davis | Aug. 13, 1940 |
| 2,424,602 | De Swart | July 29, 1947 |
| 2,458,152 | Eakins | Jan. 4, 1949 |
| 2,510,693 | Green | June 6, 1950 |
| 2,592,130 | Erb et al. | Apr. 8, 1952 |

FOREIGN PATENTS

| | | |
|---|---|---|
| 572,789 | Great Britain | Oct. 24, 1945 |

OTHER REFERENCES

Modern Plastics, November 1945, pages 142–145, article "Fabricating with Frictional Heat" by Robert N. Freres, copy available in class 18, Reshape Digest and in the Patent Office Scientific Library.